United States Patent
Romain

(10) Patent No.: US 7,188,259 B1
(45) Date of Patent: Mar. 6, 2007

(54) METHOD FOR PROVIDING SECURITY TO A CHAINING OF OPERATIONS PERFORMED BY AN ELECTRONIC CIRCUIT WITHIN THE CONTEXT OF EXECUTING AN ALGORITHM

(75) Inventor: Fabrice Romain, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/914,172

(22) PCT Filed: Feb. 25, 2000

(86) PCT No.: PCT/FR00/00472

§ 371 (c)(1),
(2), (4) Date: Aug. 24, 2001

(87) PCT Pub. No.: WO00/50977

PCT Pub. Date: Aug. 31, 2000

(30) Foreign Application Priority Data

Feb. 25, 1999 (FR) .................................. 99 02364

(51) Int. Cl.
*G06F 9/06* (2006.01)
*G06F 21/00* (2006.01)
(52) U.S. Cl. .................... 713/194; 713/400; 726/23
(58) Field of Classification Search .................. 380/46, 380/37, 29; 713/189, 400, 194; 726/23
See application file for complete search history.

(56) References Cited

U.S. PATENT DOCUMENTS

| | | | | |
|---|---|---|---|---|
| 5,018,027 A | * | 5/1991 | Roggendorf | 386/65 |
| 5,249,294 A | * | 9/1993 | Griffin et al. | 726/23 |
| 5,404,402 A | * | 4/1995 | Sprunk | 713/189 |
| 5,944,833 A | * | 8/1999 | Ugon | 713/400 |
| 6,971,020 B1 | * | 11/2005 | Liardet et al. | 713/190 |

FOREIGN PATENT DOCUMENTS

| | | | |
|---|---|---|---|
| EP | 0448262 A | * | 9/1991 |
| GB | 2319705 A | * | 5/1998 |
| WO | WO 9733217 A | * | 9/1997 |

OTHER PUBLICATIONS

Cohen F. B., "Operating System Protection Through Program Evolution", Computers & Security, vol. 12, No. 6, Oxford, GB.☐☐pp. 565-584, xp000415701.*
Dallas Semiconductor Corp.: "Section I: Introduction", Oct. 6, 1993, Data Book Soft Microcontroller, pp. 1-292.*

* cited by examiner

*Primary Examiner*—Gilberto Barron, Jr.
*Assistant Examiner*—Tongoc Tran
(74) *Attorney, Agent, or Firm*—Lisa K. Jorgenson; Allen, Dyer, Doppelt, Milbrath & Gilchrist, P.A.

(57) ABSTRACT

A method for providing security to a chaining of useful operations of the same type, performed by an electronic circuit executing an algorithm, randomly introduces one or more dummy operations in the chaining of operations. This prevents any fraudulent access to protected data through a statistical analysis of electrical currents.

13 Claims, No Drawings

METHOD FOR PROVIDING SECURITY TO A CHAINING OF OPERATIONS PERFORMED BY AN ELECTRONIC CIRCUIT WITHIN THE CONTEXT OF EXECUTING AN ALGORITHM

FIELD OF THE INVENTION

The present invention relates to the field of cryptology, and more particularly, to a method for providing security to a chaining of operations performed by an electronic circuit executing an algorithm. In the context of the invention, an algorithm should be understood as a chaining of actions required for accomplishing a task. Therefore, this does not necessarily mean the implementation of a computer program.

BACKGROUND OF THE INVENTION

Cryptology may be defined as the science for hiding information. It forms with the physical security of the components and operating systems the essential dimension of security for chip cards. Cryptology includes cryptography which is the art of encrypting and decrypting messages, and cryptological analysis which is the art of breaking secret codes.

In chip cards, cryptography implements various mechanisms which have the purpose of providing either confidentiality of the information, or authentication of the cards or the users, or even the signature of messages. All the means which implement cryptography form a cryptosystem. Such cryptosystems contain confidential information, notably for encryption and decryption of digital messages.

Among this confidential information, the encryption and decryption keys which are parameters of a secret agreement used for encryption and decryption of digital messages may be mentioned. The use of these encryption and decryption keys often requires several data transfers which characterizes them. When they are used within a cryptosystem, the characteristic data of digital keys and other confidential information flow between various memory or processing registers and modules. These transfers between registers and/or modules are expressed by the appearance of electrical currents or magnetic fields bearing pieces of confidential information. These pieces of confidential information may for example, relate to the encryption and decryption keys.

Such cryptosystems pose a problem of visibility from the outside world. A measurement of the electrical signals or the magnetic fields arising from the exchanges of information between different portions of the circuit may provide access to pieces of confidential information which are involved in the protection of data by the encryption or decryption system. For example, one of the electrical signals may be located at the power supply contact of the circuit, whether the latter is internal or external.

When the digital key is used by an authorized component, such as a chip card, a certain visibility, for example on the digital key, is made possible by investigating such electrical signals. The sensitive electrical signals may be observed on different contacts of the circuit, notably connecting different memory or processing registers or modules.

A digital key may thus be discovered as a result of accumulating electrical or magnetic signal measurements and of a statistical analysis of these measurements. More generally, any electronic circuit has an electrical consumption related to the operations which it carries out. It is possible to discover hidden information in the circuit by measuring this consumption. This problem is posed in any secured component, and notably in components for chip cards.

Discovery of protected data by observation of the current generally requires a reproducibility of the current measurement to carry out statistical processing. Thus, when an electronic circuit executes an algorithm containing identical or similar and recurrent operations, such as transfer of confidential data between registers, and where fine observation of the operations one by one may disclose confidential information, a statistical analysis based on the measurement of the aforementioned electrical currents may be detrimental to the security of the electronic circuit.

SUMMARY OF THE INVENTION

An object of the present invention is to find a remedy to the problems which have just been described. Accordingly, a method for avoiding a disclosure by observation of the current of protected data is provided. For this purpose, the method for providing security to a chaining of operations performed by an electronic circuit executing an algorithm provides invisibility with regards to analysis of electrical signals related to data transfers between various registers. More specifically, the security is provided by the presence of parasitic information which interferes with the observation, from the outside of the electronic circuit, of physical phenomena associated with the execution of useful operations.

To achieve this object, the invention inserts dummy operations in a chaining of useful operations of the same type, which is carried out in the context of executing an algorithm. The dummy operations are very similar to the useful operations. Each dummy operation is inserted at a random line for each execution of the algorithm. Thus, acquisition of comparable current measurements becomes very difficult.

A dummy operation may be designed as an operation having an identical signature or virtually very close to a useful operation in terms of the observable physical parameters associated with the execution of this instruction (e.g., current consumption, magnetic radiation, etc.). These physical parameters may notably be detected at a current or voltage supply terminal of the circuit. In this way, the present dummy operations cannot be detected, sample by sample, and therefore they prevent any statistical analysis or at least make it very difficult.

The invention accordingly relates to a method for providing security to a chaining of useful operations, of the same type, performed by an electronic circuit in the context of executing an algorithm. Each of the useful operations corresponds to a step of the algorithm, characterized in that the method comprises randomly introducing one or several dummy operations of the same type in the chaining of useful operations.

A dummy operation of the same type as a useful operation may assume various forms according to the relevant application, from the moment that it has physical characteristics which appear identical or sufficiently close to a useful operation to make its detection difficult. As a non-limiting example, a dummy operation may be the real execution of a calculation, but without recording the result in memory, or with recording but in an inoperative memory for the relevant operation.

False calculations or false subsets of operations may thus be introduced with the dummy operations. The present invention also relates to an electronic device for executing an algorithm, for example a chip card, characterized in that it implements the aforementioned method for providing security, possibly with the optional aspects which are described below.

Various aspects and advantages of the invention will become more clearly apparent in the following description, which shows a preferred embodiment of the method according to the invention and which is only given indicatively and by no means as limiting the invention.

DETAILED DESCRIPTION OF THE PREFERRED EMBODIMENTS

According to a preferred embodiment of the invention, a certain number of dummy operations are inserted between useful operations, of the same type, performed by an electronic circuit executing an algorithm. These dummy operations are introduced in a random way, and may be introduced in any useful operation associated with the algorithm.

One or several dummy operations may also be found before the first useful operation associated with an algorithm, or after the last useful operation associated with an algorithm. Several consecutive dummy operations may also be found. To provide different series of current measurements at each execution of a same algorithm, new random operations are introduced in each execution of an algorithm.

However, in a preferred application, the method according to the invention comprises the additional step of maintaining a constant time interval between the performance of two operations, whether they are successive useful and/or dummy operations. Thus, the insertion of dummy operations does not obviously appear upon a time investigation of the electrical signals associated with the useful operations performed by an electronic circuit in the context of executing an algorithm.

Finally, it is preferable but not mandatory that the number of dummy operations introduced in the chaining of useful operations be constant for each new execution of the algorithm. Thus, the execution time of the algorithm in its whole is the same for each execution of the algorithm. The fact that dummy operations have been introduced is thus invisible upon a first analysis, which again provides better security for the chaining of useful operations.

According to the invention, it is also possible to distribute the random operations only on certain portions of the algorithm. Further, the method according to invention may also be applied to algorithms having operations which are ordered, i.e., the useful operations must be chained in an order which cannot be changed. The number of introduced dummy operations in a preferred application of the invention is on the order of 2 percent based on the total number of performed operations.

That which is claimed is:

1. A method for providing security to a chaining of useful operations, of a same type, performed by an electronic circuit executing an algorithm, each of the useful operations corresponding to a step of the algorithm, the method comprising;
    randomly introducing at least one dummy operation of the same type in the chaining of useful operations; and
    maintaining a constant time interval between execution of two successive useful operations.

2. A method according to claim 1, further comprising maintaining a constant time interval between execution of two successive dummy operations.

3. A method according to claim 1, further comprising maintaining a constant time interval between execution of two successive useful and dummy operations.

4. A method according to claim 1, wherein a number of dummy operations is constant for each new execution of the algorithm.

5. A method for providing security to an electronic circuit executing an algorithm, the method comprising:
    executing the algorithm so that useful operations of a same type are chained together, with each useful operation corresponding to a step of the algorithm;
    maintaining a constant time interval between execution of two successive useful operations; and
    randomly introducing at least one dummy operation of the same type in the chaining of useful operations.

6. A method according to claim 5, further comprising maintaining a constant time interval between execution of two successive dummy operations.

7. A method according to claim 5, further comprising maintaining a constant time interval between execution of two successive useful and dummy operations.

8. A method according to claim 5, wherein a number of dummy operations is constant for each new execution of the algorithm.

9. An electronic device comprising:
    a processor for executing an algorithm that includes a plurality of useful operations of a same type, and a routine for providing security to a chaining of the plurality of useful operations, with each useful operation corresponding to a step of the algorithm, the routine randomly introducing at least one dummy operation of the same type in the chaining of useful operations, and the routine maintaining a constant time interval between execution of two successive useful operations.

10. An electronic device according to claim 9, wherein the routine maintains a constant time interval between execution of two successive dummy operations.

11. An electronic device according to claim 9, wherein the routine maintains a constant time interval between execution of two successive useful and dummy operations.

12. An electronic device according to claim 9, wherein a number of dummy operations is constant for each new execution of the algorithm.

13. An electronic device according to claim 9, wherein the electronic device is configured as a chip card.

* * * * *